United States Patent [19]
Oku et al.

[11] Patent Number: 5,556,133
[45] Date of Patent: Sep. 17, 1996

[54] AUTOMOTIVE FUEL TANK MOUNTING ASSEMBLY

[75] Inventors: Yasunori Oku; Teruaki Anzawa; Tsutomu Ogawa; Shinji Hinosawa, all of Saitama-ken, Japan

[73] Assignee: Honda Giken Kogyo Kabushiki Kaisha, Tokyo, Japan

[21] Appl. No.: 448,263

[22] Filed: May 23, 1995

[30] Foreign Application Priority Data

Jul. 26, 1994 [JP] Japan .................................. 6-193533

[51] Int. Cl.⁶ .................................................. B62D 21/00
[52] U.S. Cl. .......................... 280/781; 280/834; 296/204
[58] Field of Search ............................... 180/69.4, 311, 180/312, 296; 280/781, 784, 834; 296/204

[56] References Cited

U.S. PATENT DOCUMENTS

| | | | |
|---|---|---|---|
| 4,098,520 | 7/1978 | Ezaki et al. ............................... | 280/784 |
| 4,416,461 | 11/1983 | Hayashi et al. ........................... | 280/784 |
| 5,174,628 | 12/1992 | Hayatsugu et al. ...................... | 296/188 |

FOREIGN PATENT DOCUMENTS

| | | | |
|---|---|---|---|
| 57-191130 | 11/1982 | Japan ..................................... | 180/69.4 |
| 4-11517 | 1/1992 | Japan ..................................... | 280/834 |

*Primary Examiner*—Paul N. Dickson
*Attorney, Agent, or Firm*—Armstrong, Westerman, Hattori, McLeland & Naughton

[57] ABSTRACT

A fuel tank is supported by an upper surface of a subframe, inclined surfaces abutting four corners of the fuel tank, and steel straps passed across the upper surface of the fuel tank. Thus, the fuel tank can be securely mounted on the subframe without involving any play, and it can be accomplished by engaging relatively rigid and mechanically strong parts of the fuel tank. Thus, various advantages obtained by mounting a fuel tank on a subframe can be obtained without any need to reinforce the fuel tank or the subframe or to take any costly special measures.

18 Claims, 5 Drawing Sheets

AUTOMOTIVE FUEL TANK MOUNTING ASSEMBLY

TECHNICAL FIELD

The present invention relates to a fuel tank mounting assembly for an automotive vehicle.

BACKGROUND OF THE INVENTION

Conventionally, an automotive fuel tank is typically mounted under the rear seats or under the mar floor, and is fixed against the lower surface of the vehicle body by steel straps passed longitudinally across the lower surface of the fuel tank. There have been attempts to favorably combine a fuel tank with a rear subframe. For instance, the subframe has a rectangular annular shape, and the fuel tank is received in an central recess defined by the rear subframe. In another case, the fuel tank is mounted on the upper surface of the rear subframe. In such cases, it would be possible to simplify and automate the assembly work by combining the fuel tank with the subframe into a sub assembly, and mounting this subassembly on the vehicle body.

However, the subassembly is typically mounted on the vehicle body with resilient bushings interposed therebetween to the end of preventing transmission of vibrations from the tires to the vehicle body and thereby improving the ride comfort of the vehicle, and the fuel tank is subjected to more severe vibrations and accelerations than it would be when it is mounted on the vehicle body. Therefore, special provisions have to be made when a fuel tank is to be mounted on the subframe. The special provisions include the increase in the rigidity of the fuel tank, the use of a relatively massive mounting structure, and so on which will ensure the integrity of the fuel tank, and keep the fuel tank securely fixed to the subframe under all conditions. Heretofore, it has been generally believed that the gains obtained from such a subassembly structure are not sufficient to justify the cost for such special provisions.

BRIEF SUMMARY OF THE INVENTION

In view of such problems of the prior art, a primary object of the present invention is to provide a fuel tank mounting assembly for an automotive vehicle which is simple in structure but can be securely mounted on a subframe of a vehicle body.

A second object of the present invention is to provide a fuel tank mounting assembly for an automotive vehicle which is simple in structure but can ensure the integrity of the fuel tank even under extreme conditions.

According to the present invention, these and other objects can be accomplished by providing a fuel tank mounting assembly for mounting a fuel tank on a subframe of an automotive vehicle body, comprising: a subframe having a wheel suspension system attached thereto, and adapted to be mounted on a vehicle body, the subframe defining at least a first support surface for restricting a vertical movement of the fuel tank, and a second support surface for restricting a fore-and-aft movement of the fuel tank; and means for holding the fuel tank against the first and second surfaces, typically consisting of a pair of straps passed across a surface of the fuel tank opposite to the surface of the fuel tank supported by the first supporting surface.

According to a more specific aspect of the present invention, the present invention provides a fuel tank mounting assembly for mounting a fuel tank on a subframe of an automotive vehicle body, comprising: a subframe having a wheel suspension system attached thereto, and adapted to be mounted on a vehicle body, the subframe including a substantially rectangular annular subframe main body, a reinforcement member extending across the subframe main body and defining an upper surface for supporting a bottom surface of the fuel tank, a support member integrally attached to the subframe main body and defining a support surface abutting a front surface of the fuel tank; and strap means having two ends attached to the subframe main body and passed across an upper surface of the fuel tank.

Thus, by holding the fuel tank against the supporting surfaces of the subframe by straps or other means, the fuel tank can be supported securely against fore-and-aft and vertical impacts. The straps can be passed either laterally across the upper surface of the fuel tank or longitudinally across the upper surface of the fuel tank. In either case, by placing at least one of the straps on a forwardly inclined surface defined in a front end portion of the upper surface of the fuel tank, it is possible to positively hold the fuel tank against the supporting surface of the subframe. According to a preferred embodiment of the present invention, a front end portion of the upper surface of the fuel tank includes a forwardly inclined surface, and the strap means includes a pair of laterally extending straps, a front one of the straps being passed across the forwardly inclined surface.

To ensure snug placement of the fuel tank on the subframe, the support surface of the support member preferably defines an obtuse angle with respect to the upper surface of the reinforcement member. Typically, the subframe supports rear wheel suspension systems, and the support member may consist of a trailing arm pivoting bracket and/or a control arm pivoting bracket for a wheel suspension system. According to a preferred embodiment of the present invention, the support surfaces of the support members surround corner sections of the fuel tank so that the fuel tank may be supported against lateral movement, and, more importantly, the fuel tank may engage the subframe at portions thereof which are relatively rigid and mechanically strong. Thus, the fuel tank can be favorably secured to the subframe, and the fuel tank is able to withstand the forces applied thereto to secure the fuel tank on the subframe.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
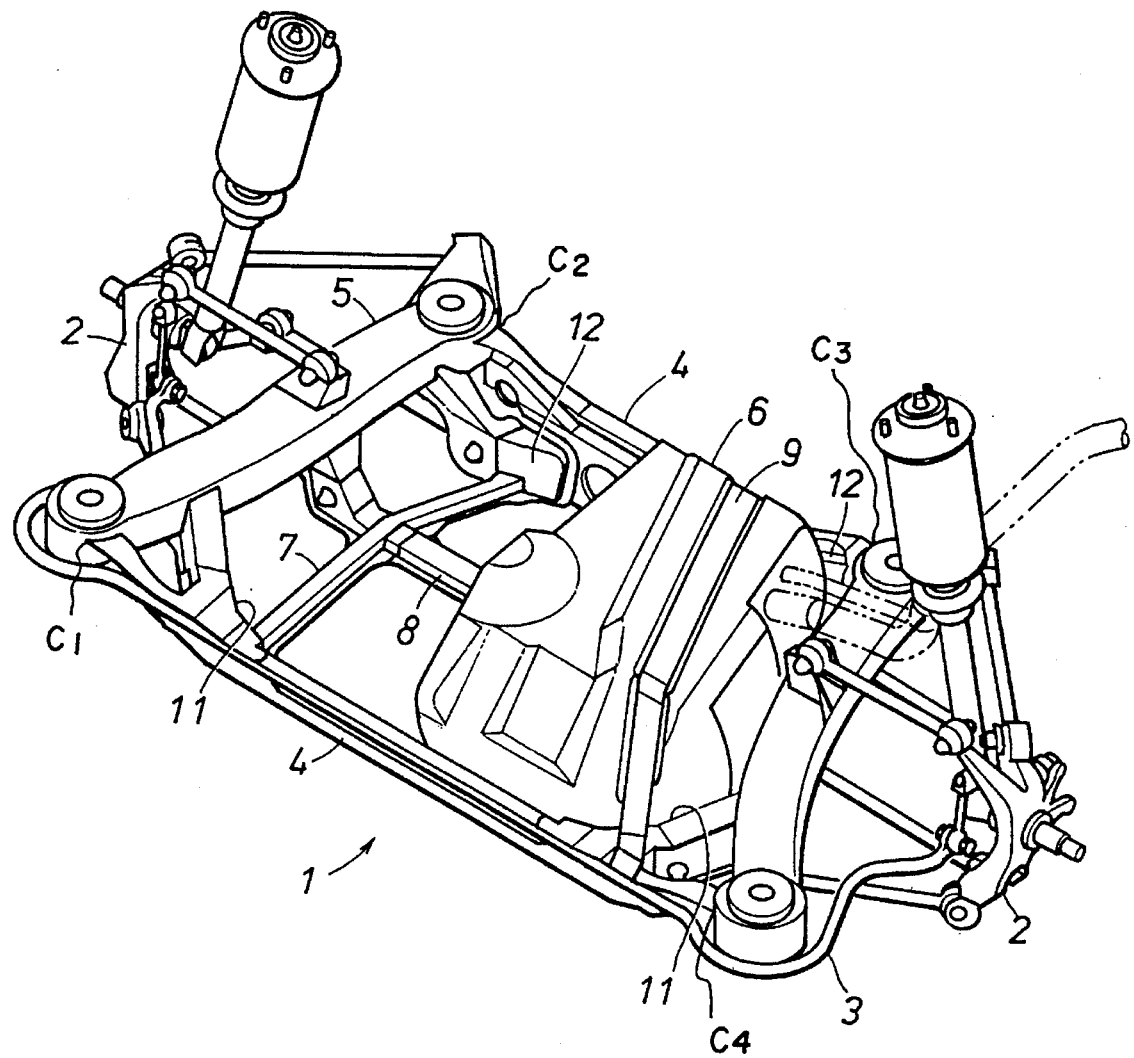
FIG. 1 is a partly broken away perspective view of a first embodiment of the fuel tank mounting assembly according to the present invention.

FIG. 1 is a perspective view showing an essential part of a multi-link type automotive rear wheel suspension system to which the present invention is applied. This rear suspension system comprises a subframe 1 formed by combining a plurality of steel members into a cage structure, a pair of rear hub carriers 2 each supported by the subframe 1 by a plurality of upper and lower link arms, and a stabilizer rod 3 connected between the hub carriers 2 via stabilizer links.

Figure 2:
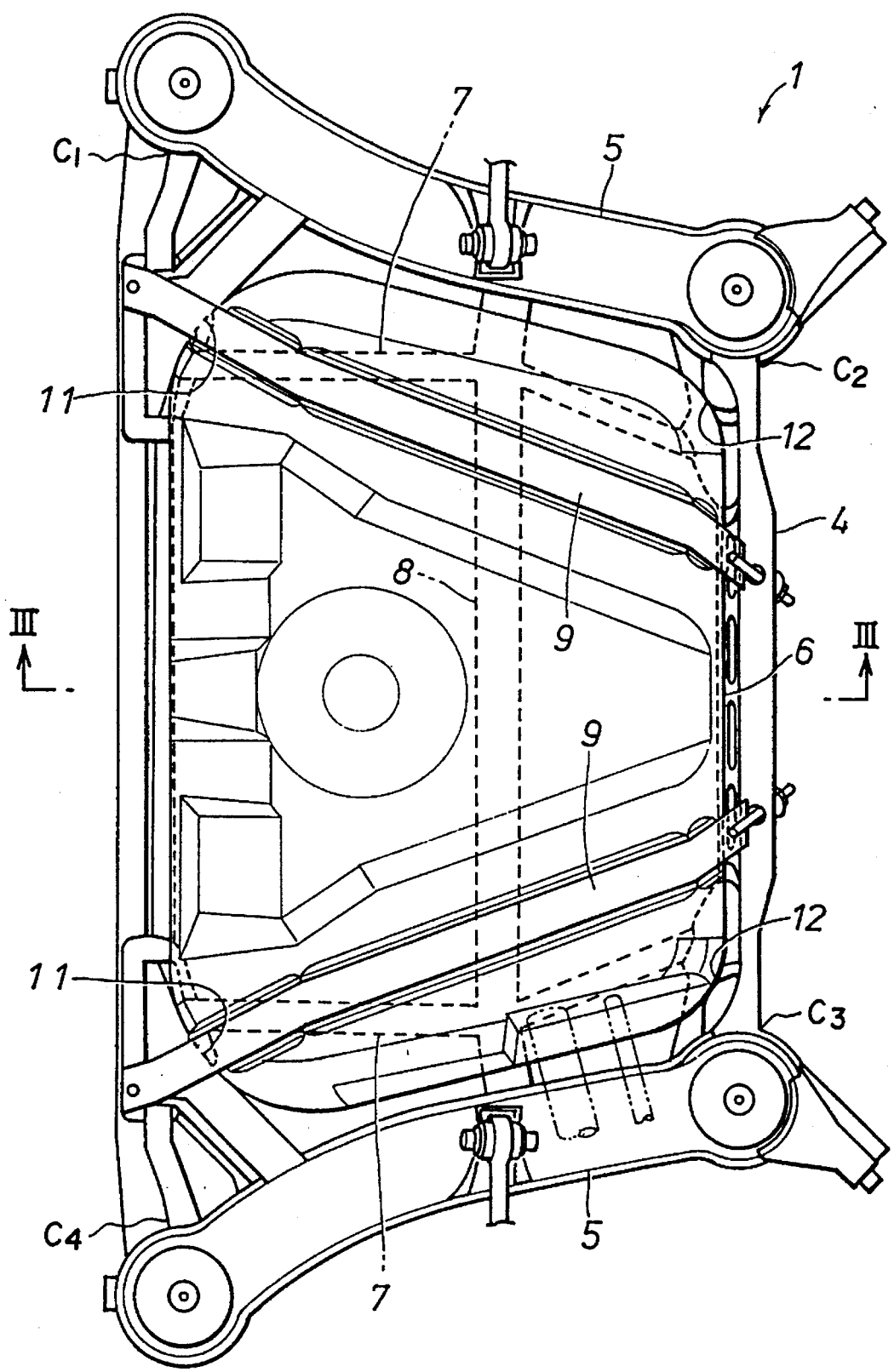
FIG. 2 is a plan view of the fuel tank mounting assembly.

As best illustrated in FIG. 2, the subframe 1 comprises a pair of cross members 4 laterally across the vehicle body, and a pair of side members 5, i.e., The pair of cross members 4 including a front cross member and a rear cross member. The front cross member having a trailing arm pivoting bracket 11 integrally attached to each of its longitudinal ends and the rear cross member having a control arm pivoting bracket 12 integrally attached to each of its longitudinal ends. Thus, the trailing arm pivoting bracket 11 of each longitudinal end of the front cross member is attached to a front portion of each side member 5 at corners $C_1$ and $C_4$ and the control arm pivoting bracket 12 of each longitudinal end of the rear cross member is attached to a front portion of each side member 5 at corners $C_2$ and $C_3$. The subframe 1 thus defines a substantially rectangular annular frame structure. A pair of longitudinal reinforcement members 7 are bridged across the front and rear cross members 4, and a lateral reinforcement member 8 is bridged across the left and right side members 5 and the longitudinal reinforcement members 7. These members are welded or otherwise securely attached to each other at each of the intersections of these members. A fuel tank 6 is received inside this frame structure, and rests on the upper surface of the longitudinal and lateral reinforcement members 7 and 8. The side members 5 extend at a higher vertical elevation than the cross members 4, and thus flank the fuel tank 6 on either side.

A pair of steel straps 9 are passed longitudinally across the upper surface of the fuel tank 6, and the two ends of each of the steel straps 9 are attached to the front and rear cross members 4, respectively.

The two ends of each of the right and left longitudinal reinforcement members 7 are attached to a trailing arm pivoting bracket 11 and a control arm pivoting bracket 12, respectively. These brackets 11 and 12 are integrally secured to the front and rear cross members 4, respectively. These brackets 11 and 12 contribute to the increase in the rigidity of the subframe 1 particularly because they are located in four corners of the rectangular frame structure.

Figure 3:
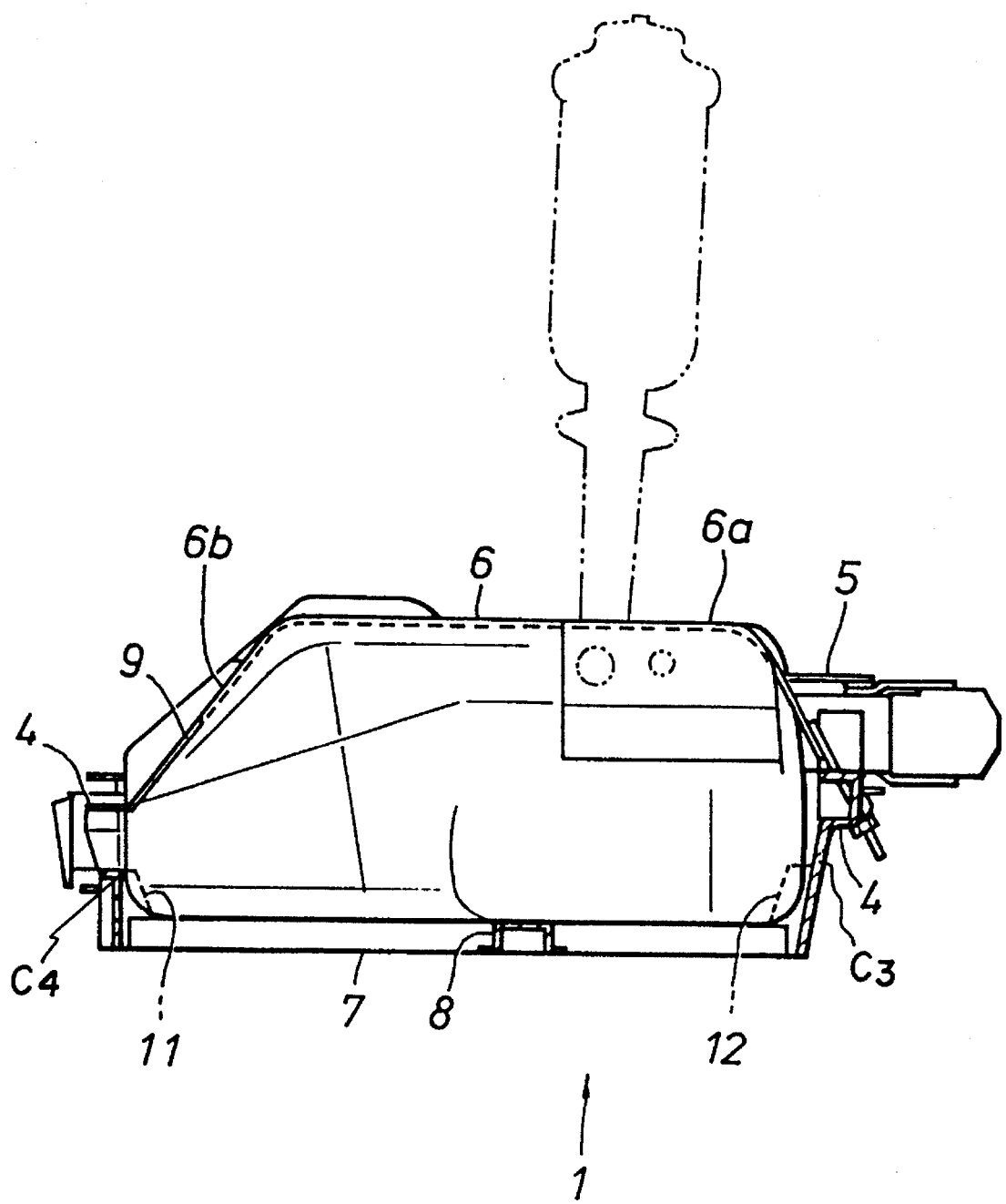
FIG. 3 is a sectional view taken along line III—III of FIG. 2.

As shown in FIG. 3, in addition to that the fuel tank 6 rests upon the upper surfaces of the longitudinal and lateral reinforcement members 7 and 8, the front and rear surfaces of the fuel tank 6 abut the tapered surfaces of the trailing arm pivoting brackets 11 and the control arm pivoting brackets 12, respectively. As mentioned earlier, these brackets 11 and 12 are integrally formed on the cross members 4. As shown in FIGS. 1 and 2, the tapered surfaces of these brackets surround the curved corners of the fuel tank 6, and can thereby support the fuel tank 6 against both longitudinal and lateral movements. In other words, the fuel tank 6 is snugly received by a complementary recess defined by the upper surfaces of the longitudinal and lateral reinforcement members 7 and 8, and the tapered surfaces of the trailing arm pivoting brackets 11 and the control arm pivoting brackets 12.

The upward movement of the fuel tank 6 is restricted by the steel straps 9. Because the two ends of the steel straps 9 are secured to the relatively rigid cross members 4, the steel straps 9 can very securely fix the fuel tank 6 against a vertical movement thereof.

Thus, the fuel tank is securely mounted on the subframe in a stable manner without any play, and is protected from any ill effect which may be otherwise caused by the vibration of the subframe as the vehicle travels over irregular road surfaces. Because the fuel tank is supported at four corners thereof by the tapered or inclined surfaces, the fuel tank is protected from deformation even when the steel strap is passed around the upper surface of the fuel tank with a high tension. Even when the subframe is deformed as a result of a vehicle crash or similar, because the fuel tank is supported against impact in horizontal directions by the tapered surfaces at its four corners which are relatively rigid, the fuel tank is protected from excessive deformation.

As can be readily appreciated, it is also possible to invert the supporting structure for the fuel tank. More specifically, the upper surface of the fuel tank may be supported by the subframe while the lower surface of the fuel tank may be supported by steel straps. Further, the steel straps may be omitted altogether by using suitable support brackets which may be secured to the subframe with fasteners.

Figure 4:
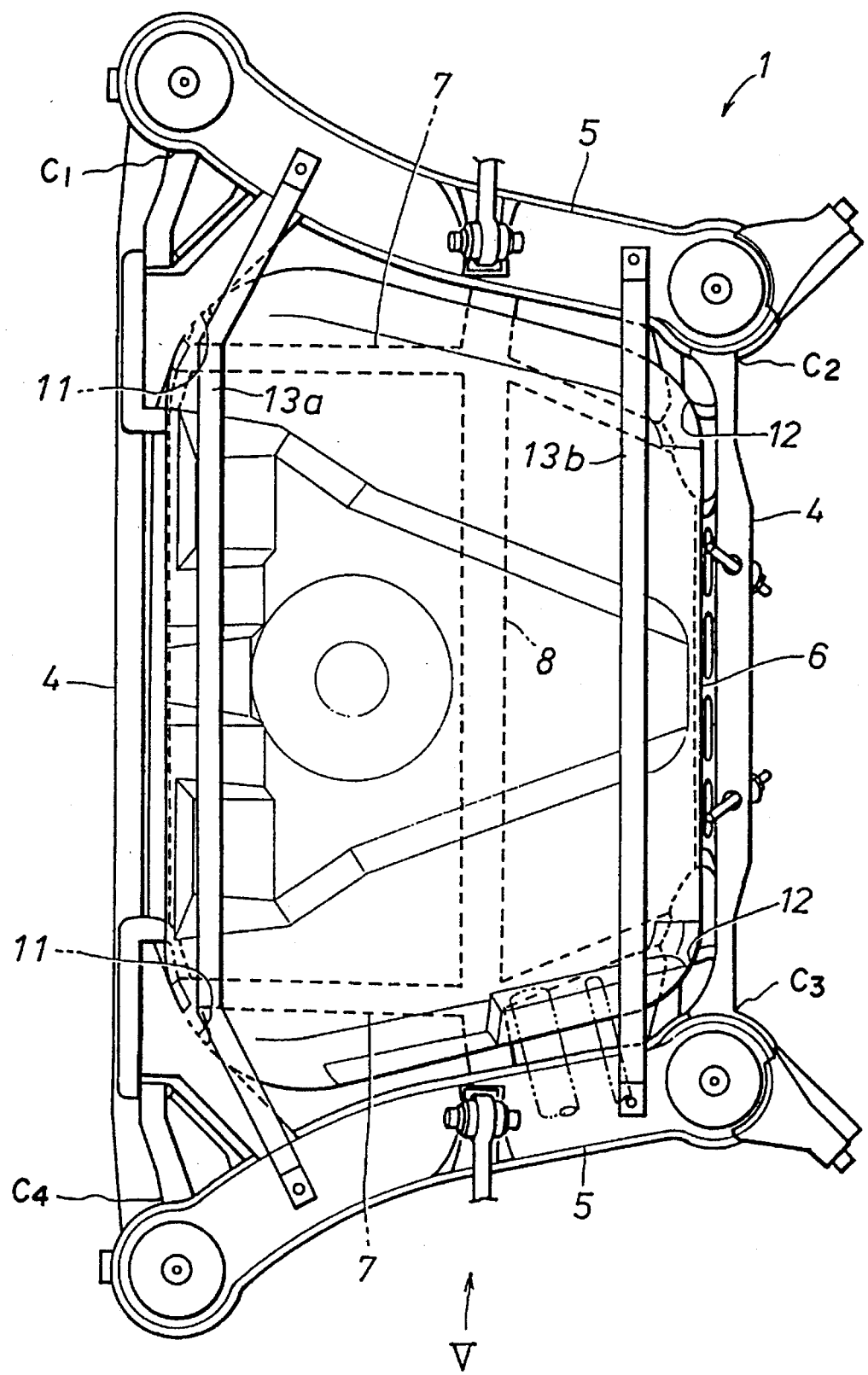
FIG. 4 is a view similar to FIG. 2 showing a second embodiment of the present invention.
Figure 5:
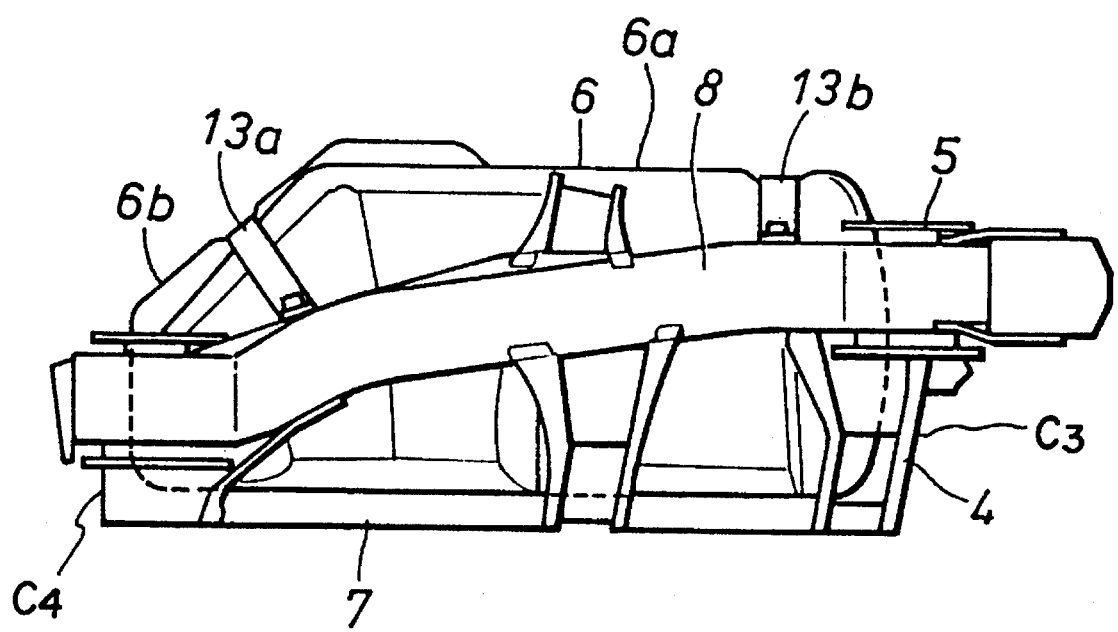
FIG. 5 is a sectional view taken along line V—V of FIG. 4.

FIGS. 4 and 5 show a second embodiment of the present invention, in which the parts corresponding to those of the previous embodiments are denoted with like numerals. This embodiment is similar to the first embodiment with respect to the structure of the subframe, and the only difference consists of the way the steel straps are passed around the upper surface of the fuel tank. More specifically, the lower surface and the four corner portions of the fuel tank 6 are supported by the subframe 1 in the same manner as the first embodiment, but the steel straps 13a and 13b are passed laterally across the upper surface of the fuel tank 6 with the two ends of each steel strap attached to the side members 5.

According to the second embodiment, by passing the front steel strap 13a across a slanted surface 6b in the forward end of the upper surface of the fuel tank 6, and tensioning the front steel strap 13a, it can apply not only a downward force but also a rearward force to the fuel tank 6. Thus, the steel strap 13a is effective in securing the fuel tank 6 not only against vertical movement but also against fore-and-aft movement. This is advantageous because the need for restraining the fuel tank against vertical and fore-and-aft movement is generally much greater than that against lateral movement.

According to the present invention, the fuel tank can be securely mounted on the subframe without involving any play, and it can be accomplished by engaging relatively rigid and mechanically strong parts of the fuel tank. Thus, various advantages obtained by mounting a fuel tank on a subframe can be obtained without any need to reinforce the fuel tank or the subframe or to take any costly special measures.

What we claim is:

1. A fuel tank and fuel tank mounting assembly for mounting said fuel tank on a subframe of an automotive vehicle body, comprising:

a subframe including a pair of side members and a pair of cross members having a wheel suspension system attached thereto, and adapted to be mounted on a vehicle body, said subframe defining at least a first support means for restricting a vertical movement of said fuel tank, and a second support means for restricting a fore-and-aft movement of said fuel tank, wherein said first support means are upper surfaces of lateral and longitudinal reinforcement members and said second support means are side surfaces of said cross members, said side members being at a higher vertical elevation than said cross members; and means for holding said fuel tank against said first and second support means, wherein said holding means is at least one strap contacting an upper surface of said fuel tank.

2. The fuel tank and fuel tank mounting assembly according to claim 1, wherein said holding means comprises a strap passed across a surface of said fuel tank opposite to the surface of said fuel tank supported by said first supporting means.

3. A fuel tank and fuel tank mounting assembly for mounting said fuel tank on a subframe of an automotive vehicle body, comprising:

a subframe having a wheel suspension system attached thereto, and adapted to be mounted on a vehicle body, said subframe including a substantially rectangular annular surface main body and defining an upper surface for supporting a bottom surface of said fuel tank, a support member integrally attached to said subframe main body and defining a support surface abutting a front surface of said fuel tank; and strap means having two ends attached to said subframe main body and passed across an upper surface of said fuel tank;

wherein said strap means is passed laterally across said upper surface of said fuel tank; and wherein a front end portion of said upper surface of said fuel tank includes a forwardly inclined surface, and said strap means includes a pair of laterally extending straps, a front one of said straps being passed across said forwardly inclined surface.

4. The fuel tank and fuel tank mounting assembly according to claim 3, wherein said strap means is passed longitudinally across said upper surface of said fuel tank.

5. The fuel tank and fuel tank mounting assembly according to claim 3, wherein said support surface of said support member defines an obtuse angle with respect to said upper surface.

6. The fuel tank and fuel tank mounting assembly according to claim 3, wherein said support member consists of a trailing arm pivoting bracket for a wheel suspension system.

7. The fuel tank and fuel tank mounting assembly according to claim 3, wherein said subframe main body is provided with an additional support member integrally attached thereto defining a support surface abutting a rear surface of said fuel tank.

8. The fuel tank and fuel tank mounting assembly according to claim 3, wherein said support surface of said support member surrounds a corner section of said fuel tank.

9. The fuel tank and fuel tank mounting assembly according to claim 3, wherein said support member consists of a trailing arm pivoting bracket for a wheel suspension system.

10. A fuel tank anti fuel tank mounting assembly for mounting said fuel tank on a subframe of an automotive vehicle body, comprising:

a subframe having a wheel suspension system attached thereto, and adapted to be mounted on a vehicle body, said subframe including a substantially rectangular annular surface main body and defining an upper surface for supporting a bottom surface of said fuel tank, a support member integrally attached to said subframe main body and defining a support surface abutting a front surface of said fuel tank; and strap means having two ends attached to said subframe main body and passed across an upper surface of said fuel tank, wherein said support surface of said support member defines an obtuse angle with respect to said upper surface.

11. A fuel tank and fuel tank mounting assembly according to claim 10, wherein said support member consists of a trailing arm pivoting bracket for a wheel suspension system.

12. The fuel tank and fuel tank mounting assembly according to claim 10, wherein said support surface of said support member surrounds a corner section of said fuel tank.

13. A fuel tank and fuel tank mounting assembly for mounting said fuel tank on a subframe of an automotive vehicle body, comprising:

a subframe having a wheel suspension system attached thereto, and adapted to be mounted on a vehicle body, said subframe including a substantially rectangular annular surface main body and defining an upper surface for supporting a bottom surface of said fuel tank, a support member integrally attached to said subframe main body and defining a support surface abutting a front surface of said fuel tank;

strap means having two ends attached to said subframe main body and passed across an upper surface of said fuel tank; and wherein said subframe main body is provided with an additional support member integrally attached thereto defining a support surface abutting a rear surface of said fuel tank.

14. The fuel tank and fuel tank mounting assembly according to claim 13, wherein said additional support member consists of a control arm pivoting bracket for a wheel suspension system.

15. The fuel tank and fuel tank mounting assembly according to claim 13, wherein said support surface of said support member surrounds a corner section of said fuel tank.

16. The fuel tank and fuel tank mounting assembly according to claim 14, wherein said support surface of said additional support member surrounds a corner section of said fuel tank.

17. The fuel tank and fuel tank mounting assembly according to any one of claim 3, 10 or 13, wherein said subframe main body includes first and second cross members having trailing arm pivoting brackets and control arm pivoting brackets, respectively, integrally attached to longitudinal ends thereof, and first and second side members extending between lateral ends of said first and second cross members, respectively, such that said trailing arm pivoting brackets on each said longitudinal end of said first cross member are attached to a front end of said first and second side members and said control arm pivoting brackets on each said longitudinal end of said second cross member are attached to a rear portion of said first and second side members to define a substantially rectangular annular structure of said subframe, and lateral reinforcement member extending between said first and second side members, and at least one longitudinal reinforcement member extending between said first and second cross members.

18. A fuel tank and fuel tank mounting assembly for mounting said fuel tank on a subframe of an automotive vehicle body, comprising:

a subframe having a wheel suspension system attached thereto, and adapted to be mounted on a vehicle body, said subframe including a substantially rectangular annular surface main body and defining an upper surface for supporting a bottom surface of said fuel tank, a support member integrally attached to said subframe main body and defining a support surface abutting a front surface of said fuel tank;

strap means having two ends attached to said subframe main body and passed across an upper surface of said fuel tank;

wherein said subframe main body is provided with an additional support member integrally attached thereto defining a support surface abutting a rear surface of said fuel tank; and wherein said additional support member consists of a control arm pivoting bracket for said wheel suspension system.

* * * * *